(12) United States Patent
Hirata et al.

(10) Patent No.: US 11,772,523 B2
(45) Date of Patent: Oct. 3, 2023

(54) ALIGHTING ASSISTANCE DEVICE AND METHOD

(71) Applicant: Mazda Motor Corporation, Hiroshima (JP)

(72) Inventors: Yoshito Hirata, Aki-gun (JP); Tomonori Ohtsubo, Aki-gun (JP); Hiroki Uemura, Aki-gun (JP); Kengo Iwata, Aki-gun (JP); Masato Maeda, Aki-gun (JP); Hiroaki Matsuda, Aki-gun (JP); Masahito Kashihara, Aki-gun (JP); Chieko Nakagami, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 144 days.

(21) Appl. No.: 17/567,882

(22) Filed: Jan. 4, 2022

(65) Prior Publication Data

US 2022/0212572 A1 Jul. 7, 2022

(30) Foreign Application Priority Data

Jan. 7, 2021 (JP) .................................. 2021-001407

(51) Int. Cl.
*B60N 2/14* (2006.01)
*B60N 2/12* (2006.01)
*B60N 2/02* (2006.01)
*B60N 2/00* (2006.01)

(52) U.S. Cl.
CPC .............. *B60N 2/12* (2013.01); *B60N 2/002* (2013.01); *B60N 2/0224* (2013.01); *B60N 2/0248* (2013.01); *B60N 2002/0256* (2013.01)

(58) Field of Classification Search
CPC ...... B60N 2/14; B60N 2/0224; B60N 2/0248; B60N 2/002; B60N 2002/0256
See application file for complete search history.

(56) References Cited

U.S. PATENT DOCUMENTS

| | | | |
|---|---|---|---|
| 5,187,665 A * | 2/1993 | Futami .................. | B62D 1/181 318/467 |
| 6,574,879 B1 * | 6/2003 | Lowery .................... | G01B 5/20 33/645 |
| 7,734,061 B2 * | 6/2010 | Breed ............... | B60R 21/01542 348/47 |

(Continued)

FOREIGN PATENT DOCUMENTS

JP 2017-171175 A 9/2017

*Primary Examiner* — Syed A Islam
(74) *Attorney, Agent, or Firm* — XSENSUS LLP

(57) ABSTRACT

An alighting assistance device D of the present disclosure may be a device moving a driver seat rearward in a case where a determination is made that an occupant seated on the driver seat of a vehicle alights. The device may include a reclining mechanism as one example of an angle changer which changes an angle of a seat back of the driver seat with respect to a horizontal plane, a sitting height acquirer which acquires a sitting height of the occupant, and a seat controller as one example of an angle controller which controls the angle changer such that the angle of the seat back becomes closer to be perpendicular as the sitting height acquired by the sitting height acquirer is higher in the case where a determination is made that the occupant alights.

20 Claims, 6 Drawing Sheets

(56) References Cited

U.S. PATENT DOCUMENTS

| | | | | |
|---|---|---|---|---|
| 7,970,175 | B2* | 6/2011 | Malawey | B60N 2/002 |
| | | | | 382/104 |
| 8,184,856 | B2* | 5/2012 | Smith | G06V 20/597 |
| | | | | 340/576 |
| 8,548,209 | B2* | 10/2013 | Lung | G06V 40/19 |
| | | | | 382/104 |
| 8,604,932 | B2* | 12/2013 | Breed | B60R 21/0132 |
| | | | | 340/576 |
| 8,958,955 | B2* | 2/2015 | Hotary | B60N 2/0244 |
| | | | | 297/284.3 |
| 10,967,899 | B2* | 4/2021 | Toyama | B62D 1/10 |
| 11,358,494 | B2* | 6/2022 | Nawrocki | B60N 2/853 |
| 11,440,439 | B2* | 9/2022 | Lee | B60N 2/0228 |
| 11,541,785 | B2* | 1/2023 | Sugiyama | B60N 2/22 |
| 11,562,579 | B2* | 1/2023 | Kim | B60W 50/14 |
| 11,648,853 | B2* | 5/2023 | Fu | B60N 2/995 |
| | | | | 297/217.2 |
| 2004/0036330 | A1* | 2/2004 | Itami | B60N 2/067 |
| | | | | 297/243 |
| 2012/0053793 | A1* | 3/2012 | Sala | B60N 2/0244 |
| | | | | 701/45 |
| 2012/0086249 | A1* | 4/2012 | Hotary | B60N 2/20 |
| | | | | 297/284.3 |
| 2015/0375638 | A1* | 12/2015 | Farooq | B60N 2/06 |
| | | | | 296/65.18 |
| 2016/0332538 | A1* | 11/2016 | Rocha | B60N 2/0252 |
| 2021/0053590 | A1* | 2/2021 | Namba | B60W 40/08 |
| 2022/0063448 | A1* | 3/2022 | Munoz Perez | B60R 11/04 |
| 2022/0212572 | A1* | 7/2022 | Hirata | B60N 2/002 |
| 2022/0324354 | A1* | 10/2022 | Kim | B60N 2/20 |
| 2023/0038920 | A1* | 2/2023 | Mizoi | G01B 5/24 |

* cited by examiner

| BODY HEIGHT [cm] | EYE LEVEL (HEIGHT FROM REFERENCE POINT OF SEAT) [cm] | | | | | | |
|---|---|---|---|---|---|---|---|
| | 76 | 77 | ... | 97 | 98 | 99 | 100 |
| 150 | SH11 | SH12 | ... | SH123 | SH124 | SH125 | SH126 |
| 151 | SH21 | SH22 | ... | SH223 | SH224 | SH225 | SH226 |
| 152 | SH31 | SH32 | ... | SH323 | SH324 | SH325 | SH326 |
| . | . | . | ... | . | . | . | . |
| . | . | . | ... | . | . | . | . |
| . | . | . | ... | . | . | . | . |
| 185 | SH361 | SH362 | ... | SH3623 | SH3624 | SH3625 | SH3626 |
| 186 | SH371 | SH372 | ... | SH3723 | SH3724 | SH3725 | SH3726 |
| 187 | SH381 | SH382 | ... | SH3823 | SH3824 | SH3825 | SH3826 |
| 188 | SH391 | SH392 | ... | SH3923 | SH3924 | SH3925 | SH3926 |
| 189 | SH401 | SH402 | ... | SH4023 | SH4024 | SH4025 | SH4026 |
| 190 | SH411 | SH412 | ... | SH4123 | SH4124 | SH4125 | SH4126 |

ALIGHTING ASSISTANCE DEVICE AND METHOD

CROSS-REFERENCE TO RELATED APPLICATION

The present application claims priority to Japanese patent application JP 2021-001407, filed Jan. 7, 2021, the entire contents of which being incorporated herein by reference in its entirety.

TECHNICAL FIELD

The present disclosure relates to an alighting assistance device and an alighting assistance method that assist an occupant in alighting from a driver seat.

BACKGROUND ART

In a case where an occupant alights from a driver seat, his/her body making an alighting action may interfere with a steering wheel, the driver seat, or the like, and the alighting action may be inhibited. Thus, a device has been known which assists an occupant in alighting from a driver seat in order to make alighting easy, and for example, a retraction action control apparatus for a vehicle seat is disclosed in Patent Literature 1.

The retraction action control apparatus for a vehicle seat which is disclosed in Patent Literature 1 is a retraction action control apparatus including a retraction action controller which detects an alighting timing and causes a foremost seat to automatically perform slide movement in a vehicle front-rear direction, in which in a case where a line which divides a portion between linear portions of a pillar front end and a pillar back end of center pillars arranged on door sides of the foremost seat into two equal parts, the linear portions resulting from removal of respective curvature portions of the pillar front end and the pillar back end, is referred to as pillar bisector, when the retraction action controller detects the alighting timing, the retraction action controller performs a retraction action control process such that a reclining rotation center portion of the foremost seat as seen from a vehicle side direction performs slide movement from a driving posture seat position at a time when the alighting timing is detected to a retracted seat position on a vehicle front side including positions overlapping with the pillar bisector.

CITATION LIST

Patent Literature

[Patent Literature 1] Japanese Patent Laid-Open No. 2017-171175

SUMMARY

Problems to be Solved

A retraction action control apparatus for a vehicle seat which is disclosed in above Patent Literature 1 detects an alighting timing and causes a foremost seat to automatically perform slide movement to a retracted seat position, and a foot side space of an occupant is thus expanded. This makes alighting of the occupant easy. However, because an alighting action is an action of a whole body, consideration of only a foot side may be insufficient.

The present disclosure has been made in consideration of the above circumstance, and other problems, and an object thereof is to provide an alighting assistance device and an alighting assistance method that can make alighting easier.

Means for Solving the Problems

As a result of various studies, the inventor has found that the above object is achieved by the present disclosure described below. That is, an alighting assistance device according to one aspect of the present disclosure is a device moving a driver seat rearward in a case where a determination is made that an occupant seated on the driver seat of a vehicle alights, the alighting assistance device including: an angle change unit which changes an angle of a seat back of the driver seat with respect to a horizontal plane; a sitting height acquisition unit which acquires a sitting height of the occupant; and an angle controller which controls the angle change unit such that the angle of the seat back becomes closer to perpendicular as the sitting height acquired by the sitting height acquisition unit is higher in the case where a determination is made that the occupant alights.

In a case where the occupant alights, the occupant often alights while raising his/her upper body. In the alighting assistance device, in a case where the occupant seated on the driver seat of the vehicle alights, because the driver seat moves rearward, a foot side space of the occupant expands, and the occupant thus easily moves his/her legs. Furthermore, because the angle change unit is controlled to change the angle of the seat back such that the angle of the seat back becomes closer to perpendicular as the sitting height is higher, the occupant easily raises his/her upper body. Thus, the alighting assistance device can make alighting easier.

In another aspect, in the above-described alighting assistance device, the sitting height acquisition unit includes an input unit which inputs a body height of the occupant, a measuring unit which measures an eye level of the occupant seated on the driver seat of the vehicle, and a sitting height processing unit which obtains the sitting height of the occupant based on the body height input to the input unit and the eye level measured by the measuring unit.

It is possible to obtain a so-called hip point based on the eye level, and it is possible to obtain the sitting height based on the body height and the hip point. The alighting assistance device includes the input unit, the measuring unit, and the sitting height processing unit and can thus precisely acquire the sitting height by a simple procedure.

In another aspect, in the alighting assistance device in those above descriptions, the angle of the seat back which is changed by the angle change unit in the case where a determination is made that the occupant alights is defined within a predetermined angle range, and the angle controller controls the angle change unit such that the angle of the seat back becomes a maximum angle in the angle range in a case where the sitting height acquired by the sitting height acquisition unit is a predetermined value or greater.

In a case where the sitting height of the occupant is comparatively high, when the angle of the seat back is made closer to perpendicular, the head of the occupant is positioned closer to a ceiling of a cabin, and this may give discomfort to the occupant. In a case where the sitting height is the predetermined value or greater, the alighting assistance device controls the angle change unit such that the angle of the seat back becomes the maximum angle in the angle range. Thus, even in a case where the sitting height of the occupant is comparatively high, discomfort which is given to the occupant when the angle of the seat back is made closer to perpendicular can be reduced or removed.

In another aspect, in the alighting assistance device in those above descriptions, when the driver seat is moved rearward, the driver seat is moved rearward such that a movement amount becomes smaller as the sitting height acquired by the sitting height acquisition unit is higher. The above-described alighting assistance device optionally further includes a position change unit which changes a position of the driver seat in a front-rear direction and a position controller which controls the position change unit such that the movement amount becomes smaller as the sitting height acquired by the sitting height acquisition unit is higher in the case where a determination is made that the occupant alights.

Such an alighting assistance device decreases the rearward movement amount of the driver seat as the sitting height is higher. Thus, the occupant whose sitting height is high can easily move his/her body weight in alighting. Consequently, the alighting assistance device can make alighting easier. Further, the rearward movement amount of the driver seat can be minimized.

In another aspect, in the alighting assistance device in those above descriptions, after the driver seat moves rearward, the angle controller controls the angle change unit. The above-described alighting assistance device optionally further includes a position change unit which changes a position of the driver seat in a front-rear direction and a position controller which controls the position change unit such that the position of the driver seat comes to a rear side in the case where a determination is made that the occupant alights, and the angle controller optionally controls the angle change unit after the position controller controls the position change unit.

Such an alighting assistance device moves the driver seat rearward and thereafter changes the angle of the seat back. Thus, because the occupant has a wider clearance from the steering wheel (because the distance between the steering wheel and the occupant becomes longer), the occupant can be given a sense of security about an action of changing the angle of the seat back.

An alighting assistance method according to another aspect of the present disclosure is a method moving a driver seat rearward in a case where a determination is made that an occupant seated on the driver seat of a vehicle alights, the alighting assistance method including: a sitting height acquisition step of acquiring a sitting height of the occupant; and an angle control step of changing an angle of a seat back such that the angle of the seat back of the driver seat with respect to a horizontal plane becomes closer to perpendicular as the sitting height acquired in the sitting height acquisition step is higher in the case where a determination is made that the occupant alights.

In such an alighting assistance method, in a case where the occupant seated on the driver seat of the vehicle alights, because the driver seat moves rearward, a foot side space of the occupant expands, and the occupant thus easily moves his/her legs. Furthermore, because the angle of the seat back is changed such that the angle of the seat back becomes closer to perpendicular as the sitting height is higher, the occupant easily raises his/her upper body. Thus, the alighting assistance method can make alighting easier.

Advantageous Effect of Disclosure

An alighting assistance device and an alighting assistance method according to the present disclosure can make alighting easier.

BRIEF DESCRIPTION OF DRAWINGS

FIG. 3 is a diagram illustrating, as one example, a sitting height conversion table which is stored in the alighting assistance device according to one embodiment of the present disclosure.

MODE FOR CARRYING OUT THE DISCLOSURE

Figure 1:
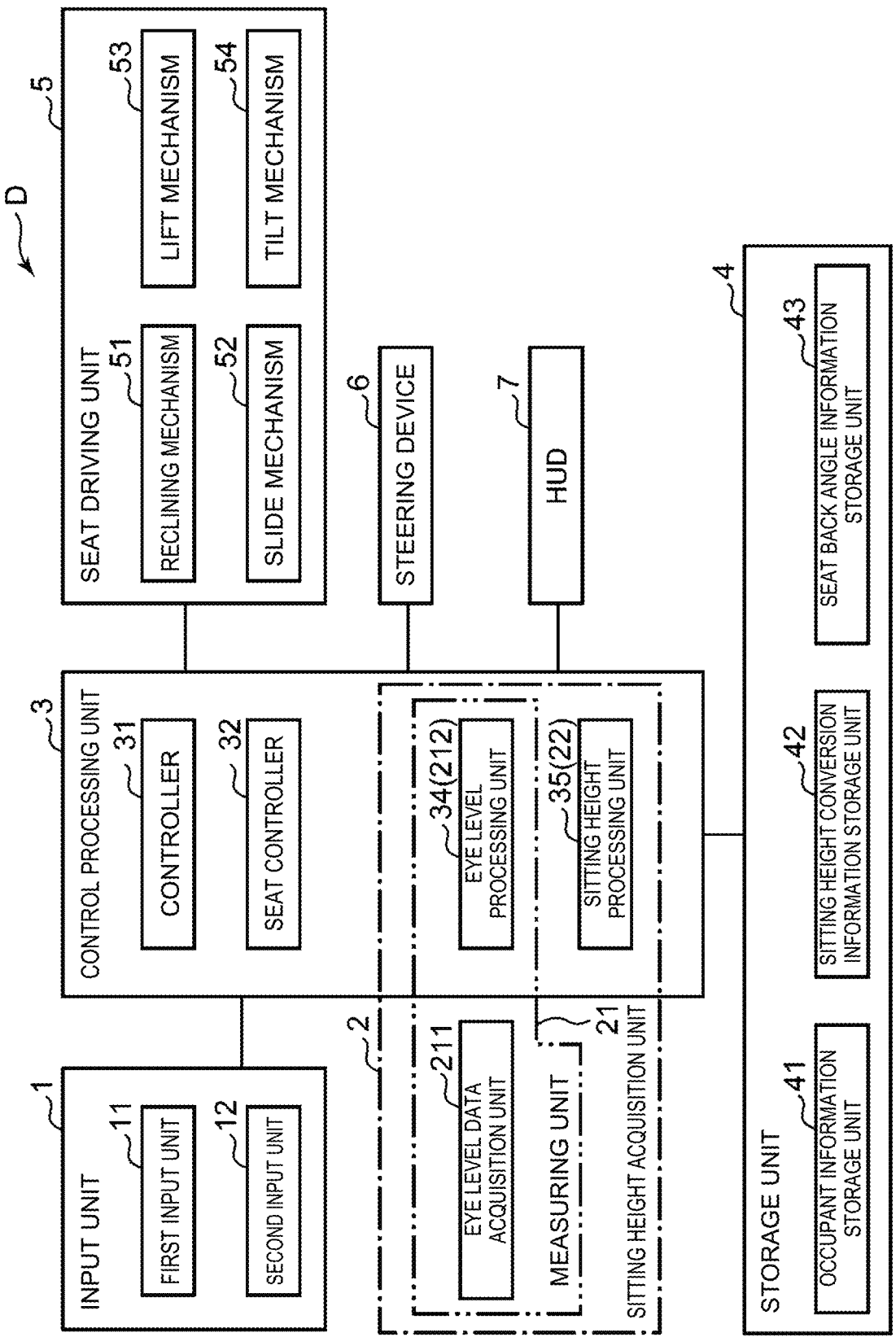
FIG. 1 is a block diagram illustrating a configuration of an alighting assistance device according to one embodiment of the present disclosure.

One or plural embodiments of the present disclosure will hereinafter be described with reference to drawings. However, the scope of the disclosure is not limited to the disclosed embodiments. Note that configurations provided with the same reference characters in the drawings indicate the same configurations, and description thereof will appropriately be omitted. In the present specification, in a case where configurations are referred to as generic terms, those will be denoted by reference characters without additional characters. In a case where an individual configuration is indicated, the configuration will be denoted by a reference character with an additional character.

An alighting assistance device in one embodiment is a device being installed in a vehicle and moving a driver seat rearward in a case where a determination is made that an occupant seated on the driver seat of a vehicle alights. The alighting assistance device includes: an angle change unit which changes an angle of a seat back of the driver seat with respect to a horizontal plane; a sitting height acquisition unit which acquires a sitting height of the occupant; and an angle controller which controls the angle change unit such that the angle of the seat back becomes closer to perpendicular as the sitting height acquired by the sitting height acquisition unit is higher in the case where a determination is made that the occupant alights. In the following, such an alighting assistance device will more specifically be described.

Figure 2:
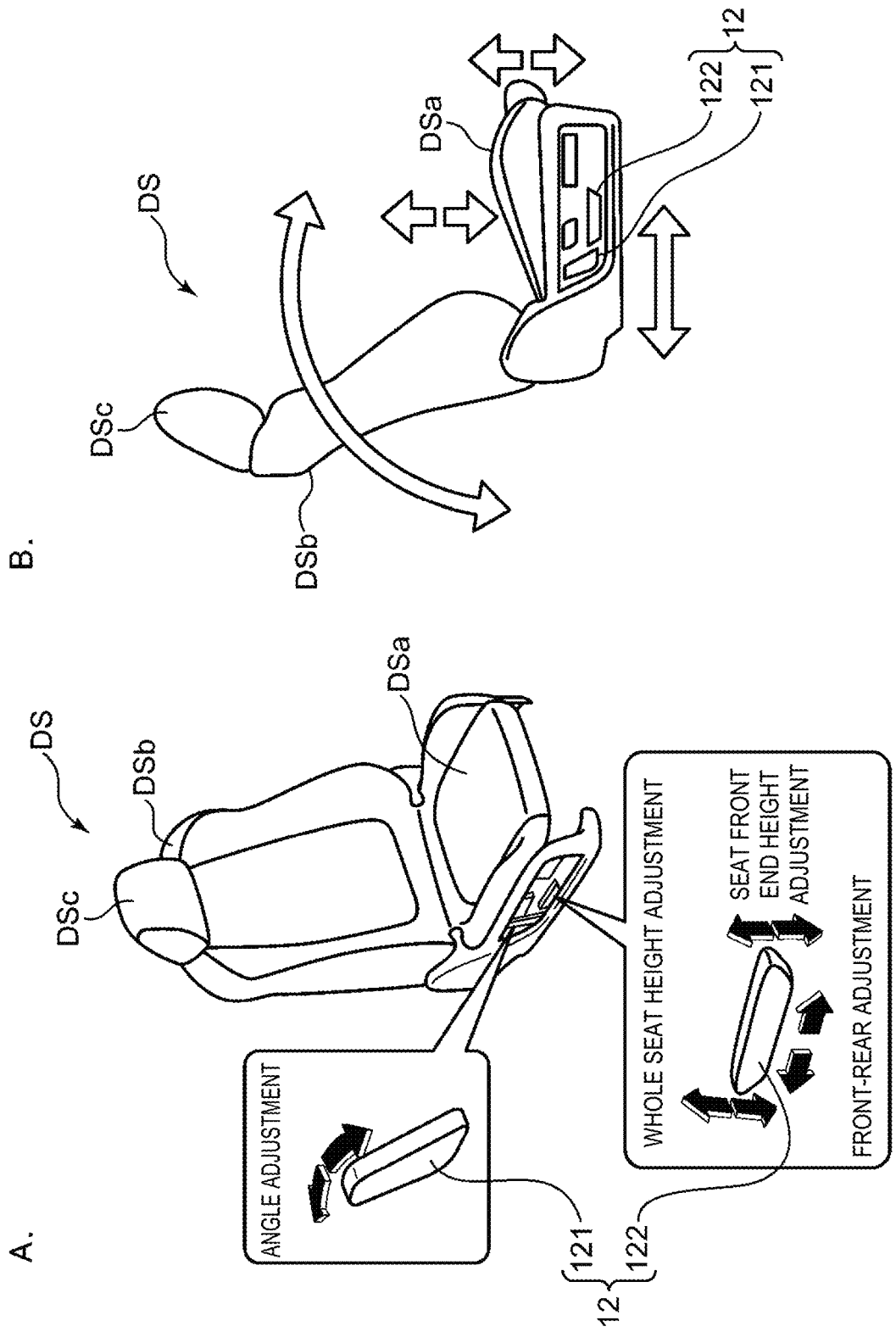
FIG. 2 is a diagram for explaining a second input unit of the alighting assistance device according to one embodiment of the present disclosure.
Figure 4:
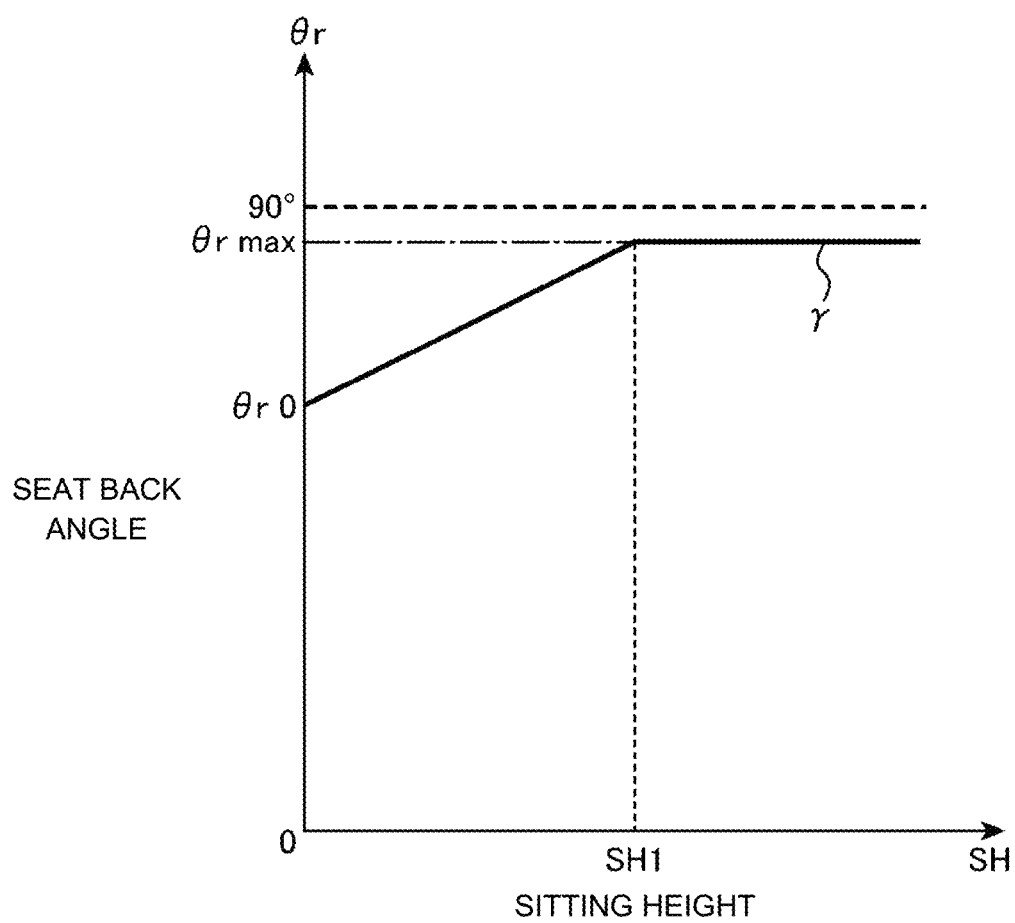
FIG. 4 is a diagram illustrating, as one example, seat back angle information which is stored in the alighting assistance device according to one embodiment of the present disclosure.

FIG. 1 is a block diagram illustrating a configuration of the alighting assistance device in one embodiment of the present disclosure. FIG. 2 is a diagram for explaining a second input unit of the alighting assistance device according to one embodiment of the present disclosure. FIG. 2A is a perspective view, and FIG. 2B is a side view. FIG. 3 is a diagram illustrating, as one example, a sitting height conversion table which is stored in the alighting assistance device according to one embodiment of the present disclosure. FIG. 4 is a diagram illustrating, as one example, seat back angle information which is stored in the alighting assistance device according to one embodiment of the present disclosure. The seat back angle information indicates the correspondence relationship between the sitting height and the angle of the seat back with respect to the horizontal plane, the horizontal axis of FIG. 4 represents the sitting height, and the vertical axis represents the angle of the seat back.

Here, in the following descriptions, the terms denoting directions such as "front", "rear", "right", "left", "up", "down", and so forth indicate the directions of the vehicle in a case where a moving direction in forward traveling of the vehicle is set as "front".

As illustrated in FIG. 1, for example, an alighting assistance device D in the embodiment includes an input unit or inputter 1, a sitting height acquisition unit or acquirer 2, a control processing unit or processor 3, a storage unit 4, a seat driving unit 5, and a steering device 6. In the example illustrated in FIG. 1, the alighting assistance device D may further include a head-up display (HUD) 7.

The seat driving unit 5 may be a device which is connected with the control processing unit 3 and moves a posture of a driver seat DS of the vehicle in accordance with control by the control processing unit 3. As illustrated in FIG. 2, for example, the driver seat (a seat for a driver) DS includes a seat cushion DSa which forms a seat surface, a seat back DSb which, at its lower end (one end), is mounted on a back end (other end) of the seat cushion DSa and serves as a backrest, and a pillow-like headrest DSc which is mounted on an upper end (other end) of the seat back DSb. The seat driving unit 5 is incorporated in this driver seat DS. In the present embodiment, the seat driving unit 5 includes an electrically driven reclining mechanism 51 which adjust an inclination of the seat back DSb, an electrically driven slide mechanism 52 which adjusts a position (front-rear position) of the seat cushion DSa in a front-rear direction, an electrically driven lift mechanism 53 which adjusts a position (up-down position, height) of the seat cushion DSa in an up-down direction, and an electrically driven tilt mechanism 54 which adjusts a height of a front end (one end) of the seat cushion DSa in the up-down direction and thereby adjusts an inclination of the seat surface of the seat cushion DSa, for example. Such electrically motorized reclining mechanism 51, slide mechanism 52, lift mechanism 53, and tilt mechanism 54 are configured by known usual means and are disclosed in Japanese Patent Laid-Open No. 2011-79472, Japanese Patent Laid-Open No. 2019-172016, Japanese Patent Laid-Open No. 2006-218882, and so forth, for example. As illustrated in FIG. 6A described later, an inclination Or of the seat back DSb (an angle of the seat back DSb) is expressed by an angle formed by an extension direction extending in a general height direction of a seat back DSb with respect to a horizontal plane (for example, a floor surface or the like of the vehicle) which has the up-down direction as a normal line. The inclination of the seat surface is expressed by the angle formed between the horizontal plane and the seat surface.

The input unit 1 may be a device which is connected with the control processing unit 3 and inputs an instruction to move the posture of the driver seat DS (an instruction to adjust the posture of the driver seat DS), for example, and input various kinds of data such as a body height of an occupant seated on the driver seat DS, for example, various kinds of data being necessary for causing the alighting assistance device D to act. In the present embodiment, as illustrated in FIG. 1 and FIG. 2, the input unit 1 includes a first input unit 11 and a second input unit 12.

The first input unit 11 may be a device for inputting various kinds of data such as the body height of the occupant. The first input unit 11 may be configured to include plural switches such as keys in a numeric keypad, for example, but in the present embodiment, the first input unit 11 is a columnar dial switch which is rotatable around an axis and is capable of being pushed in an axis direction and is arranged in a center console partitioning the driver seat from a passenger seat in a vehicle cabin, for example. As for this dial switch, when the dial switch is rotated, a numerical value displayed in the HUD 7 (or a center display (not illustrated)) increases or decreases in accordance with a rotational direction (for example, the numerical value increases by clockwise rotation, and the numerical value decreases by counterclockwise rotation), and when the dial switch is pushed, the numerical value displayed in the HUD 7 (or the center display) is confirmed and is input to the alighting assistance device D.

The second input unit 12 may be a device for inputting the instruction to move the posture of the driver seat DS. In the present embodiment, for example, as illustrated in FIG. 2, the second input unit 12 includes a seat back switch (SB switch) 121 for inputting an instruction to adjust the inclination of the seat back DSb and a seat cushion switch (SC switch) 122 for inputting respective instructions to adjust the front-rear position, the up-down position, and the inclination of the seat surface in the seat cushion DSa and is disposed on a side surface of a lower portion of the driver seat DS such that the SB switch 121 and the SC switch 122 form a similar shape to the shape of the driver seat DS in a side view. The SB switch 121 is configured to be inclined in a general front-rear direction with respect to a lower end portion as a rotation axis. The SC switch 122 is configured such that a front end and a back end are inclined in a general up-down direction with respect to a general central portion as a rotation axis and is further configured to move in the front-rear direction.

The sitting height acquisition unit or acquirer 2 may be a device which is connected with the control processing unit 3 and acquires the sitting height of the occupant seated on the driver seat DS in accordance with control by the control processing unit 3. The sitting height acquisition unit 2 may be the first input unit 11 (may also be used as the first input unit 11), for example. Although the occupant may input his/her own sitting height by manual inputting from the first input unit 11, because the occupant hardly knows his/her own sitting height, in the present embodiment, the sitting height acquisition unit 2 includes an input unit for inputting the body height of the occupant, a measuring unit 21, and a sitting height processing unit 22 (35).

This input unit for inputting the body height of the occupant may be provided as a third input unit to the input unit 1 separately from the first and second input units 11 and 12 but is provided as the first input unit 11 (used also as the first input unit 11) in the present embodiment.

The measuring unit or measurer 21 may be a device which measures an eye level of the occupant seated on the driver seat DS of the vehicle. The eye level is measured from a predetermined reference position (height), for example, such as a position (height) of the floor surface of the vehicle, a position (height) of the seat surface of the seat cushion DSa, or a position (height) of a so-called hip point corresponding to the posture of the driver seat DS. In the present embodiment, as one example, the eye level is measured from the position (height) of the seat cushion DSa (a position of a reference point of a seat). In the present embodiment, the measuring unit 21 includes an eye level data acquisition unit 211 and an eye level processing unit 34 (212), for example. The eye level data acquisition unit 211 is a device which is connected with the control processing unit 3 and acquires a predetermined data for measuring the eye level of the occupant seated on the driver seat DS in accordance with control by the control processing unit 3. In the present embodiment, the eye level processing unit 212 (34) is functionally configured by the control processing unit 3 by execution of control processing programs described later and obtains the eye level of the occupant by processing the predetermined data acquired by the eye level data acquisition unit 211.

For example, the eye level data acquisition unit or acquirer 211 includes a camera which generates an image of the occupant seated on the driver seat DS and a distance meter which measures the distance to the occupant seated on the driver seat DS and is arranged on a lateral side of the center display (not illustrated), for example. The eye level processing unit 212 (34) obtains the eye level of the occupant based on the image of the occupant which is generated by the camera and the distance to the occupant which is measured by the distance meter. The distance meter measures the distance by so-called TOF (time of flight) based on a time between a transmission timing of an infrared light pulse and a reception timing of a reflected light, the time being obtained by transmitting the infrared light pulse and then receiving the reflected light of the infrared light pulse which is reflected by the occupant, for example. The eye level processing unit 212 (34) obtains a pixel position of a white portion of the eye by extracting the white portion of the eye by image processing such as a white filter from a predetermined image region, which is in advance defined and which the face of the occupant is assumed to enter, in the image of the occupant which is generated by the camera, obtains an actual length of a subject which enters one pixel from the distance to the occupant which is measured by the distance meter, an optical characteristic (for example, an image-capturing magnification or the like) of an image-capturing optical system of the camera, and so forth, and obtains the eye level of the occupant from an actual height of a lower end portion of the image generated by the camera, the pixel position of the white portion of the eye, and the actual length of the subject which enters one pixel. Note that the actual height of the lower end portion of the image generated by the camera is in advance obtained from optical characteristics of the image-capturing optical system in the camera, an image-capturing direction (optical axis direction), and so forth and is stored in the storage unit 4. The predetermined image region is in advance obtained from an arrangement position of the camera, an arrangement position of the driver seat DS, the optical characteristics of the image-capturing optical system of the camera, its image-capturing direction, and so forth, for example, and is stored in the storage unit 4. Alternatively, for example, the eye level data acquisition unit 211 includes a so-called stereo camera instead of the camera and the distance meter. An image of the occupant seated on the driver seat DS is generated by the stereo camera, and the distance to the occupant seated on the driver seat DS is measured by the stereo camera. Alternatively, for example, the eye level data acquisition unit 211 includes a mark whose size (dimensions) is known and a camera which generates an image of the occupant seated on the driver seat DS and the mark. The mark is provided to a part whose image can be captured by the camera even in a case where the occupant is seated on the driver seat DS, for example, a side portion of the headrest DSc, and the camera is arranged to capture an image of the face of the occupant and the mark from an obliquely front side. The eye level processing unit 212 (34) extracts each of the white portion of the eye and the mark, by image processing, from a predetermined image region in an image of the occupant which is generated by the camera, thereby obtains the pixel position of the white portion of the eye and the number of pixels which the mark enters, obtains the actual length of the subject which enters one pixel from the number of pixels which the mark enters and the size of the mark, and obtains the eye level of the occupant from the actual height of a lower end portion of the image generated by the camera, the pixel position of the white portion of the eye, and the actual length of the subject which enters one pixel.

In the present embodiment, the sitting height processing unit or processor 22 (35) may be functionally configured by the control processing unit 3 by execution of the control processing programs described later and obtains the sitting height of the occupant based on the body height input to the first input unit 11 and the eye level measured by the measuring unit 21. The sitting height processing unit 22 (35) will further be described later.

The steering device 6 may be a mechanism for steering steered wheels and includes a steering wheel, a steering shaft which is coupled with the steering wheel, a rotation angle of steering shaft sensor which detects a rotation angle of steering shaft provided to the steering shaft by an operation of the steering wheel, and a steering angle driving mechanism which gives a steering angle to the steered wheels in accordance with the rotation angle of steering angle detected by the rotation angle of steering shaft sensor. The steering shaft includes a tilt mechanism which is connected with the control processing unit 3 and moves the steering wheel up and down in an electrically driven manner in accordance with control by the control processing unit 3 and a telescopic mechanism which is connected with the control processing unit 3 and moves the steering wheel forward and rearward in an electrically driven manner in accordance with control by the control processing unit 3. Such electrically motorized tilt mechanism and telescopic mechanism are configured by known usual means and are disclosed in Japanese Patent Laid-Open No. 2020-19327, Japanese Patent Laid-Open No. 2019-23050, and so forth, for example.

The HUD 7 may be a device which is arranged in a dashboard in front of the driver seat DS, is connected with the control processing unit 3, and displays predetermined information such as the body height of the occupant which is input by the first input unit 11, for example, by projecting the predetermined information onto a transparent planar optical member such as a windshield, for example, in accordance with control by the control processing unit 3. The HUD 7 is configured by known usual means and is disclosed in Japanese Patent Laid-Open No. 2015-161965, Japanese Patent Laid-Open No. 2019-166886, and so forth, for example.

The storage unit 4 may be circuitry which is connected with the control processing unit 3 and stores various kinds of predetermined programs and various kinds of predetermined data in accordance with control by the control processing unit 3. The various kinds of predetermined programs include the control processing programs, for example. The control processing programs include a control program which respectively controls the units 1, 2, 4 to 7 of the alighting assistance device D in accordance with functions of those units, a seat control program which controls the seat driving unit 5, an eye level processing program which processes the predetermined data acquired by the eye level data acquisition unit 211 and thereby obtains the eye level of the occupant, a sitting height processing program which obtains the sitting height of the occupant based on the body height of the occupant which is input to the first input unit 11 and the eye level measured by the measuring unit 21, and so forth, for example. The various kinds of predetermined data include data necessary for executing those programs such as occupant information including the body height of the occupant, sitting height conversion information, and the steering wheel height information. Such a storage unit 4 includes a ROM (read-only memory) as a non-volatile storage element, an EEPROM (electrically erasable programmable read-only memory) as a rewritable non-volatile storage element, and so forth, for example. Furthermore, the storage unit 4 includes a RAM (random access memory) and so forth serving as a so-called working memory of the control processing unit 3, which stores data and so forth generated during execution of the predetermined programs. The storage unit 4 functionally includes an occupant information storage unit 41, a sitting height conversion information storage unit 42, and a seat back angle information storage unit 43.

The occupant information storage unit 41 may store the occupant information. The occupant information is predetermined information about the occupant which includes the body height of the occupant. When the first input unit 11 accepts the body height of the occupant seated on the driver seat DS, a controller 31 of the control processing unit 3 stores the body height of the occupant in the occupant information storage unit 41. Note that the occupant information storage unit 41 may store an identifier for specifying and identifying an occupant (occupant identifier) and the occupant information while associating those with each other. Accordingly, the occupant information for plural occupants can be stored. In this case, for example, after the occupant identifiers are displayed on the HUD 7 and the first input unit 11 accepts selection of the occupant identifier, the first input unit 11 may accept the body height of the occupant.

The sitting height conversion information storage unit 42 may store the sitting height conversion information. The sitting height conversion information is information for obtaining the sitting height based on the body height and the eye level. The sitting height conversion information may be a function formula for calculating the sitting height from the body height and the eye level, for example; however, in the present embodiment, the sitting height conversion information is a sitting height conversion table CT which is illustrated in FIG. 3 and in which the body height, the eye level, and the sitting height are associated with each other, for example. This sitting height conversion table CT is a two-dimensional matrix-like table and includes a body height registration region CTa in which respective body heights of rows are registered, an eye level registration region CTb in which the respective heights of eyes of columns are registered, and a sitting height registration region CTc in which sitting heights are registered in a two-dimensional matrix manner. In this sitting height conversion table CT, roughly, a higher sitting height SH is registered at the same body height as the eye level is higher, and a higher sitting height SH is registered at the same eye level as the body height is higher. For example, SH11<SH126 holds at a body height of 150 [cm], and SH11<SH411 holds at an eye level of 76 [cm]. Also, SH11<SH4126 holds. In such a sitting height conversion table CT, the row is designated from the rows by the body height, the column is designated from the columns by the eye level, and the sitting height in the position where those designated row and column intersect with each other is thereby selected (retrieved, extracted) from the sitting heights which are registered in a two-dimensional matrix manner. Accordingly, the sitting height based on the body height and the eye level is obtained.

The seat back angle information storage unit 43 may store the seat back angle information. The seat back angle information is information for obtaining the angle of the seat back based on the sitting height. The seat back angle information is set such that the angle of the seat back becomes closer to perpendicular as the sitting height is higher. Furthermore, the angle of the seat back is defined within a predetermined angle range, the seat back angle information is set such that the angle of the seat back becomes the maximum angle in the angle range in a case where the sitting height is a predetermined value or larger. The maximum angle is optionally smaller than 90 degrees. Consequently, even in a case where the sitting height is the predetermined value or larger, the angle of the seat back does not become perpendicular. The seat back angle information may be represented by a table in which the sitting height and the angle of the seat back are associated with each other, for example; however, in the present embodiment, the seat back angle information is a function formula for calculating the angle of the seat back from the sitting height. Optionally, in the present embodiment, for example, the seat back angle information is a function formula $F\gamma(SH)$ of a line $\gamma$ illustrated in FIG. 4. As for the function formula $F\gamma(SH)$ of the line $\gamma$, $F\gamma(SH) = c \times SH + \theta r0$ holds when $SH < SH1$, and $F\gamma(SH) = \theta rmax$ holds when $SH1 \leq SH$. A term SH denotes the sitting height, $F\gamma(SH)$ denotes the angle of the seat back in a case of the sitting height SH, $\theta r0$ denotes an initial value of the angle of the seat back which is in advance set, $\theta rmax$ denotes the maximum angle of the seat back which is in advance set ($\theta r0 \leq \theta r \leq \theta rmax$), SH1 denotes a predetermined sitting height which is in advance set, and c denotes a slope and is in advance set ($c > 0$). Those $\theta r0$, rmax, $\theta SH1$, and c are in advance and appropriately set from plural samples, for example.

The control processing unit 3 may be circuitry which respectively controls the units 1, 2, 4 to 7 of the alighting assistance device D in accordance with the functions of those units and which controls the driver seat DS such that in a case where it is determined that the occupant seated on the driver seat DS of the vehicle alights, the driver seat DS is moved rearward, and the angle of the seat back becomes closer to perpendicular as the sitting height of the occupant is higher. The control processing unit 3 is configured to include a CPU (central processing unit) and its peripheral circuits, for example. In the control processing unit 3, the control processing programs are executed, and the controller 31, a seat controller 32, the eye level processing unit 34 (212), and the sitting height processing unit 35 (22) are thereby functionally configured.

The controller 31 respectively may control the units 1, 2, 4 to 7 of the alighting assistance device D in accordance with the functions of those units and manages control of the whole alighting assistance device D.

The seat controller 32 may control the seat driving unit 5. Optionally, as illustrated in FIG. 2A, when the SB switch 121 is inclined forward and while the SB switch 121 is inclined and positioned on a front side, the seat controller 32 controls the reclining mechanism 51 such that the seat back DSb is inclined forward and the inclination of the seat back DSb gradually becomes small. When the SB switch 121 is restored (returned to a prior neutral position), the seat controller 32 stops the reclining mechanism 51. The seat back DSb maintains its posture at the current inclination. Meanwhile, when the SB switch 121 is inclined rearward, except the point that the seat back DSb is inclined rearward, the seat controller 32 acts similarly to the above-described case where the SB switch 121 is inclined forward. As illustrated in FIG. 2A, when the SC switch 122 is moved forward and while the SC switch 122 is positioned on a front side, the seat controller 32 controls the slide mechanism 52 such that the seat cushion DSa is gradually moved forward. When the SC switch 122 is restored (returned to a prior neutral position), the seat controller 32 stops the slide mechanism 52. The seat cushion DSa maintains its posture in the current front-rear position. Meanwhile, when the SC switch 122 is moved rearward, except the point that the seat cushion DSa is moved rearward, the seat controller 32 acts similarly to the above-described case where the SB switch 121 is moved forward. As illustrated in FIG. 2A, when the back end of the SC switch 122 is inclined upward and while the SC switch 122 is inclined and positioned on an upper side, the seat controller 32 controls the lift mechanism 53 so as to gradually move the seat cushion DSa upward. When the SC switch 122 is restored (returned to a prior neutral position), the seat controller 32 stops the lift mechanism 53. The seat cushion DSa maintains its posture in the current up-down position (height). Meanwhile, when the back end of the SC switch 122 is inclined downward, except the point that the seat cushion DSa is moved downward, the seat controller 32 acts similarly to the above-described case where a back end of the SC switch 122 is inclined upward. As illustrated in FIG. 2A, when the front end of the SC switch 122 is inclined upward and while the SC switch 122 is inclined and positioned on an upper side, the seat controller 32 controls the tilt mechanism 54 so as to gradually move the front end of the seat cushion DSa upward. When the SC switch 122 is restored (returned to a prior neutral position), the seat controller 32 stops the tilt mechanism 54. The seat cushion DSa maintains its posture with the seat surface at the current inclination. Meanwhile, when the front end of the SC switch 122 is inclined downward, except the point that the front end of the seat cushion DSa is moved downward, the seat controller 32 acts similarly to the above-described case where the front end of the SC switch 122 is inclined upward. When the posture of the driver seat DS is adjusted, the seat controller 32 stores the adjusted posture of the driver seat DS (the inclination of the seat back DSb, the front-rear position of the seat cushion DSa, the up-down position (height, lift amount) of the seat cushion DSa, and the tilt amount of the seat cushion DSa) in the storage unit 4.

Furthermore, the seat controller 32 may control the seat driving unit 5 so as to move the driver seat DS rearward in a case where it is determined that the occupant seated on the driver seat DS of the vehicle alights. Optionally, the seat controller 32 controls the slide mechanism 52 such that the driver seat DS is moved by a predetermined movement amount set in advance and the position of the driver seat thereby comes to a rear side in a case where it is determined that the occupant seated on the driver seat DS of the vehicle alights. Accordingly, the slide mechanism 52 moves the seat cushion DSa of the driver seat DS rearward by the predetermined movement amount from the present position, for example. Note that a limit position of rearward movement of the seat cushion DSa may in advance be set, and the movement may be stopped in a case where the limit position is reached during the rearward movement of the seat cushion DSa of the driver seat DS.

In addition, in the case where it is determined that the occupant alights, the seat controller 32 may control the reclining mechanism 51 such that the angle of the seat back becomes closer to perpendicular as the sitting height acquired by the sitting height acquisition unit 2 is higher. In the present embodiment, this change in the angle of the seat back is conducted by using the seat back angle information stored in the seat back angle information storage unit 43. Optionally, in the present embodiment, the seat back angle information is the function formula Fγ(SH). Thus, in the case where the occupant alights, the seat controller 32 substitutes the sitting height SH of the occupant which is obtained by the sitting height processing unit 22 (35) of the sitting height acquisition unit 2 into the function formula Fγ(SH) and obtains an angle Fγ(SH) of the seat back which corresponds to the sitting height of the occupant. Then, the seat controller 32 moves the driver seat DS rearward, thereafter controls the reclining mechanism 51 of the seat driving unit 5 such that the obtained angle Fγ(SH) of the seat back is provided, and thereby changes the angle of the seat back.

As described above, the eye level processing unit 34 (212) may obtain the eye level of the occupant by processing the predetermined data acquired by the eye level data acquisition unit 211.

The sitting height processing unit 35 (22) may obtain the sitting height of the occupant based on the body height of the occupant which is input to the first input unit 11 and the eye level measured by the measuring unit 21. Optionally, in the present embodiment, the sitting height processing unit 35 (22) obtains the sitting height of the occupant by using the sitting height conversion information stored in the sitting height conversion information storage unit 42 based on the body height of the occupant which is input to the first input unit 11 and the eye level measured by the measuring unit 21. Optionally, in the present embodiment, because the sitting height conversion information is the sitting height conversion table CT, the sitting height processing unit 35 (22) designates the row from the rows by the body height of the occupant which is input to the first input unit 11 and is stored as the occupant information in the occupant information storage unit 41, designates the column from the columns by the eye level measured by the measuring unit 21, thereby selects (retrieves, extracts) the sitting height in the position where those designated row and column intersect with each other from the sitting heights which are registered in a two-dimensional matrix manner, and obtains the selected sitting height as the sitting height of the occupant.

Such control processing unit 3 and storage unit 4 may be capable of being configured by a computer which is referred to as, so-called, ECU (electronic control unit).

Note that the reclining mechanism 51 of the seat driving unit 5 corresponds to one example of the angle change unit which changes the angle of the seat back of the driver seat with respect to the horizontal plane. The seat controller 32 corresponds to one example of the angle controller which controls the angle change unit such that the angle of the seat back becomes closer to perpendicular as the sitting height acquired by the sitting height acquisition unit is higher in the case where it is determined that the occupant alights.

Figure 5:
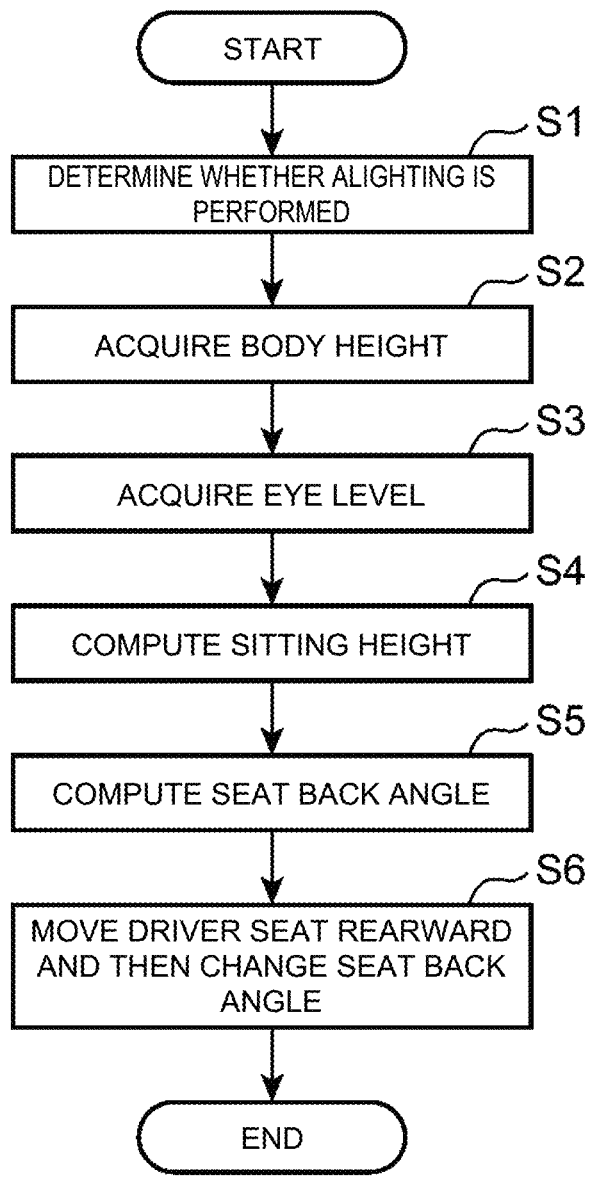
FIG. 5 is a flowchart illustrating an action of the alighting assistance device about assistance for alighting according to one embodiment of the present disclosure.
Figure 6:
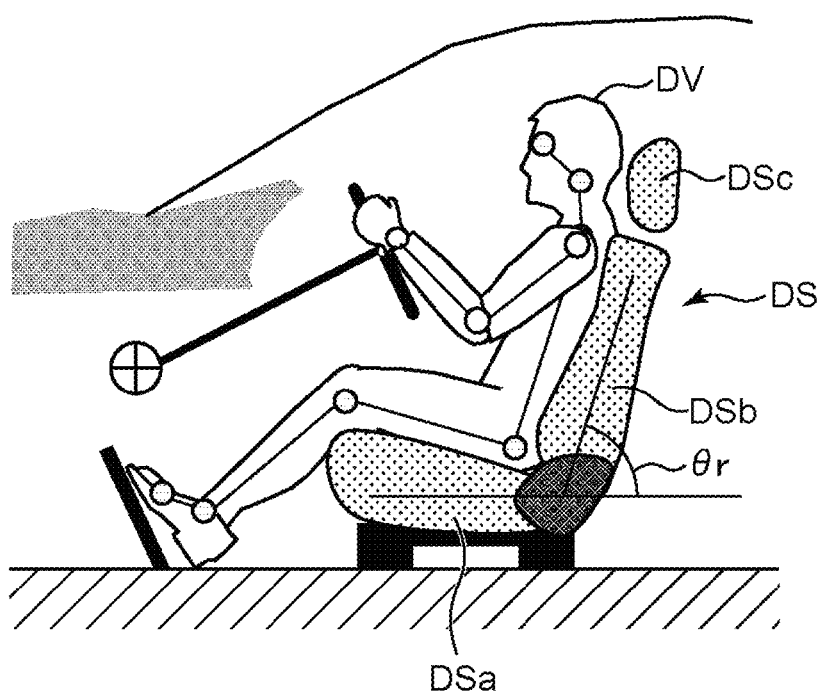
FIG. 6 is a diagram for explaining movement of a driver seat and a seat back angle in a case of alighting according to one embodiment of the present disclosure.
Figure 6:
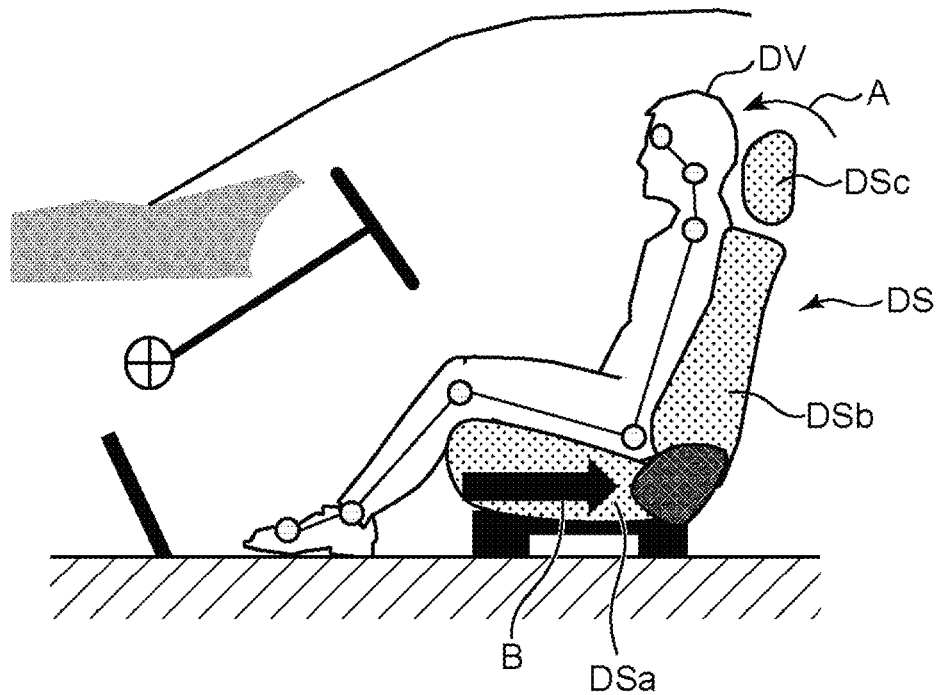

Next, an action of the present embodiment will be described. FIG. 5 is a flowchart illustrating an action of the alighting assistance device about assistance for alighting according to one embodiment of the present disclosure. FIG. 6 is a diagram for explaining movement of the driver seat and a change in the angle of the seat back in a case of alighting according to one embodiment of the present disclosure. FIG. 6A illustrates a situation where the movement of the driver seat and the change in the angle of the seat back have not yet been performed, and FIG. 6B illustrates a situation where the movement of the driver seat and the change in the angle of the seat back have already been performed.

When the vehicle starts working, such an alighting assistance device D executes initialization of each of the necessary units and starts working. The control processing programs are executed, and in the control processing unit 3, the controller 31, the seat controller 32, the eye level processing unit 34 (212), and the sitting height processing unit 35 (22) are thereby functionally configured.

The occupant who rides on the vehicle and is seated on the driver seat DS adjusts the posture of the driver seat DS so as to realize a proper driving posture (driving position). For example, the posture of the driver seat DS is adjusted as illustrated in FIG. 6A. Then, the occupant inputs his/her own body height from the first input unit 11. When the first input unit 11 accepts the body height of the occupant seated on the driver seat DS, the alighting assistance device D stores the body height of the occupant as one piece of the occupant information in the occupant information storage unit 41 of the storage unit 4 by the controller 31 of the control processing unit 3. Note that although the posture of the driver seat DS is manually adjusted here, the posture of the driver seat DS may automatically be adjusted when the first input unit 11 accepts the body height of the occupant. A proper driving posture is disclosed in Japanese Patent No. 6662360 (Japanese Patent Laid-open No. 2019-038320), for example.

The occupant seated on the driver seat DS causes the vehicle to travel and attempts to alight when the vehicle arrives at a destination, for example.

In FIG. 5, when it is determined that the occupant seated on the driver seat DS of the vehicle alights (S1), the alighting assistance device D acquires the body height of the occupant stored in the occupant information storage unit 41 by the seat controller 32 of the control processing unit 3 (S2).

The determination in process S1 is executed in accordance with ON and OFF of an ignition by an ignition key (or ignition button), for example, and when the ignition is turned OFF, the alighting assistance device D determines, by the seat controller 32 of the control processing unit 3, that the occupant seated on the driver seat DS alights. Alternatively, for example, the determination in process S1 is executed in accordance with fastening and unfastening of a seat belt of the driver seat DS, and when the seat belt is unfastened, the alighting assistance device D determines, by the seat controller 32 of the control processing unit 3, that the occupant seated on the driver seat DS alights. For example, a switch or the like which is turned ON and OFF in accordance with fastening and unfastening of a buckle of the seat belt is provided to a tongue of the seat belt, and fastening and unfastening of the seat belt can thereby be detected.

Next, the alighting assistance device D measures the eye level of the occupant seated on the driver seat DS by the measuring unit 21 (S3) and obtains, by the sitting height processing unit 22 (35), the sitting height of the occupant by using the sitting height conversion table CT stored in the sitting height conversion information storage unit 42 based on the body height of the occupant which is input to the first input unit 11 and stored in the occupant information storage unit 41 and the eye level which is measured by the measuring unit 21 (S4). Note that the alighting assistance device D may store the obtained sitting height of the occupant as one piece of the occupant information in the occupant information storage unit 41 by the controller 31 and may use the sitting height in the next or further subsequent alighting of the occupant. Further, as described above, those processes S3 and S4 are executed in a case where the first input unit 11 accepts the body height of the occupant seated on the driver seat DS when he/she rides on the vehicle, and the obtained sitting height of the occupant may be stored as one piece of the occupant information in the occupant information storage unit 41. In this case, instead of those processes S3 and S4, the alighting assistance device D may acquire the sitting height of the occupant which is stored in the occupant information storage unit 41 similarly to process S2.

Next, the alighting assistance device D obtains, by the seat controller 32, the angle of the seat back based on the sitting height of the occupant which is acquired in process S4 (S5). Optionally, the seat controller 32 substitutes the sitting height SH of the occupant which is acquired in process S4 into the function formula Fγ(SH) and thereby obtains the angle Fγ(SH) of the seat back (S5).

Then, the alighting assistance device D moves the driver seat DS rearward by the predetermined movement amount by the seat controller 32. After this movement is finished, the alighting assistance device D controls the reclining mechanism 51 in the seat driving unit 5 such that the angle Fγ(SH) of the seat back which is obtained in process S5 is provided, thereby changes the angle of the seat back (S6), and finishes this process.

Accordingly, the driver seat DS illustrated in FIG. 6A moves rearward as indicated by an arrow B in FIG. 6B, and the seat back DSb is moved as indicated by a curved arrow A in FIG. 6B such that the angle Fγ(SH) of the seat back is provided.

In a case where the occupant alights, the occupant often alights while raising his/her upper body. In the alighting assistance device D and an alighting assistance method implemented therein in the embodiment, in a case where the occupant seated on the driver seat DS of the vehicle alights, because the driver seat DS moves rearward, a foot side space of the occupant expands, and the occupant thus easily moves his/her legs. Furthermore, because the reclining mechanism 51 is controlled to change the angle of the seat back such that the angle of the seat back becomes closer to perpendicular as the sitting height is higher, the occupant easily raises his/her upper body. Thus, the above alighting assistance device D and the alighting assistance method can make alighting easier.

It is possible to obtain the so-called hip point based on the eye level, and it is possible to obtain the sitting height based on the body height and the hip point. In the present embodiment, the sitting height conversion information indicating the correspondence relationship between the body height and eye level (hip point) and the sitting height is in advance prepared and stored in the storage unit 4. The above alighting assistance device D and the alighting assistance method include the first input unit 11, the measuring unit 21, and the sitting height processing unit 22 (35) and can thus precisely acquire the sitting height by a simple procedure by using the sitting height conversion information.

In a case where the sitting height of the occupant is comparatively high, when the angle of the seat back is made closer to perpendicular, the head of the occupant is positioned closer to a ceiling of a cabin, and this may give discomfort to the occupant. In a case where the sitting height SH is a predetermined value SH1 or larger, the above alighting assistance device D and the alighting assistance method control the reclining mechanism 51 such that an angle θr of the seat back becomes a maximum angle θrmax in the angle range θr0≤θr≤θrmax. Thus, even in a case where the sitting height of the occupant is comparatively high, discomfort which is given to the occupant when the angle of the seat back is made closer to perpendicular can be reduced or removed.

The above alighting assistance device D and the alighting assistance method move the driver seat DS rearward and thereafter change the angle of the seat back. Thus, because the occupant has a wider clearance from the steering wheel (because the distance between the steering wheel and the occupant becomes longer), the occupant can be given a sense of security about an action of changing the angle of the seat back.

Note that in the above-described embodiment, when the driver seat DS is moved rearward, the alighting assistance device D may move the driver seat DS rearward such that the movement amount becomes smaller as the sitting height acquired by the sitting height acquisition unit 2 is higher. Optionally, in the case where it is determined that the occupant alights, the seat controller 32 controls the slide mechanism 52 of the seat driving unit 5 such that the movement amount becomes smaller as the sitting height acquired by the sitting height acquisition unit 2 is higher. More in detail, for example, rearward movement amount information indicating the correspondence relationship between the sitting height and the rearward movement amount of the driver seat DS is in advance prepared as a function formula or a table, for example, and is stored in the storage unit 4. The rearward movement amount information is set such that the movement amount is made smaller (less) as the sitting height is higher. Then, in a case where it is determined that the occupant seated on the driver seat DS of the vehicle alights, the seat controller 32 obtains the movement amount corresponding to the sitting height acquired by the sitting height acquisition unit 2 by using the rearward movement amount information stored in the storage unit 4 and controls the slide mechanism 52 so as to move the driver seat DS by this obtained movement amount.

The alighting assistance device D of this modification form decreases the rearward movement amount of the driver seat DS as the sitting height is higher. Thus, the occupant whose sitting height is high can easily move his/her body weight in alighting. Consequently, the above alighting assistance device D can make alighting easier. Further, the rearward movement amount of the driver seat can be minimized.

In order to express the present disclosure, the present disclosure has appropriately and sufficiently been described through the embodiments with reference to the drawings in the above descriptions. However, it should be noted that a person skilled in the art can easily change and/or improve the above-described embodiments. Accordingly, unless changed forms or improved forms that are carried out by a person skilled in the art depart from the scope of rights of the claims, the changed forms or the improved forms are construed as encompassed in the scope of rights of the claims.

REFERENCE SIGNS LIST

D alighting assistance device
1 input unit
2 sitting height acquisition unit
3 control processing unit
4 storage unit
5 seat driving unit
6 steering device
7 HUD
11 first input unit
21 measuring unit
22 (35) sitting height processing unit
211 eye level data acquisition unit
212 (34) eye level processing unit
31 controller
32 seat controller
41 occupant information storage unit
42 sitting height conversion information storage unit
43 seat back angle information storage unit
51 reclining mechanism
52 slide mechanism

The invention claimed is:

1. An alighting assistance device moving a driver seat rearward in a case where a determination is made that an occupant seated on the driver seat of a vehicle alights, the alighting assistance device comprising:
   an angle changer which changes an angle of a seat back of the driver seat with respect to a horizontal plane;
   a sitting height acquirer which acquires a sitting height of the occupant; and
   an angle controller which controls the angle changer such that the angle of the seat back becomes closer to perpendicular as the sitting height acquired by the sitting height acquirer is higher in the case where a determination is made that the occupant alights.

2. The alighting assistance device according to claim 1, wherein
   the sitting height acquirer includes
   an inputter which inputs a body height of the occupant,
   a measurer which measures an eye level of the occupant seated on the driver seat of the vehicle, and
   a sitting height processor which obtains the sitting height of the occupant based on the body height input to the inputter and the eye level measured by the measurer.

3. The alighting assistance device according to claim 2, wherein
   the angle of the seat back which is changed by the angle changer in the case where a determination is made that the occupant alights is defined within a predetermined angle range, and
   the angle controller controls the angle changer such that the angle of the seat back becomes a maximum angle in the angle range in a case where the sitting height acquired by the sitting height acquirer is a predetermined value or greater.

4. The alighting assistance device according to claim 3, wherein
   when the driver seat is moved rearward, the driver seat is moved rearward such that a movement amount becomes smaller as the sitting height acquired by the sitting height acquirer is higher.

5. The alighting assistance device according to claim 4, wherein
   after the driver seat moves rearward, the angle controller controls the angle changer.

6. An alighting assistance method moving a driver seat rearward in a case where a determination is made that an occupant seated on the driver seat of a vehicle alights, the alighting assistance method comprising:
   a sitting height acquisition step of acquiring a sitting height of the occupant; and
   an angle control step of changing an angle of a seat back such that the angle of the seat back of the driver seat with respect to a horizontal plane becomes closer to perpendicular as the sitting height acquired in the sitting height acquisition step is higher in the case where a determination is made that the occupant alights.

7. The alighting assistance device according to claim 1, wherein
the angle of the seat back which is changed by the angle changer in the case where a determination is made that the occupant alights is defined within a predetermined angle range, and
the angle controller controls the angle changer such that the angle of the seat back becomes a maximum angle in the angle range in a case where the sitting height acquired by the sitting height acquirer is a predetermined value or greater.

8. The alighting assistance device according to claim 1, wherein
when the driver seat is moved rearward, the driver seat is moved rearward such that a movement amount becomes smaller as the sitting height acquired by the sitting height acquirer is higher.

9. The alighting assistance device according to claim 1, wherein
after the driver seat moves rearward, the angle controller controls the angle changer.

10. The alighting assistance device according to claim 2, wherein
when the driver seat is moved rearward, the driver seat is moved rearward such that a movement amount becomes smaller as the sitting height acquired by the sitting height acquirer is higher.

11. The alighting assistance device according to claim 2, wherein
after the driver seat moves rearward, the angle controller controls the angle changer.

12. The alighting assistance device according to claim 3, wherein
after the driver seat moves rearward, the angle controller controls the angle changer.

13. The alighting assistance device according to claim 4, wherein
when the driver seat is moved rearward, the driver seat is moved rearward such that a movement amount becomes smaller as the sitting height acquired by the sitting height acquirer is higher.

14. The alighting assistance device according to claim 7, wherein
after the driver seat moves rearward, the angle controller controls the angle changer.

15. The alighting assistance device according to claim 8, wherein
after the driver seat moves rearward, the angle controller controls the angle changer.

16. The alighting assistance device according to claim 10, wherein
after the driver seat moves rearward, the angle controller controls the angle changer.

17. The alighting assistance device according to claim 13, wherein
after the driver seat moves rearward, the angle controller controls the angle changer.

18. A vehicle seat comprising the alighting assistance device according to claim 1.

19. A vehicle comprising the vehicle seat according to claim 18.

20. A vehicle comprising the alighting assistance device according to claim 1.

* * * * *